(12) United States Patent
Kieselhorst

(10) Patent No.: US 7,952,036 B2
(45) Date of Patent: May 31, 2011

(54) COMBINATIONAL WEIGHER WITH A RECYCLE CONVEYOR CONFIGURED TO ALLOW PRODUCTS TO BE RECIRCULATED IN A DISPERSED MANNER

(75) Inventor: Ralph Kieselhorst, Saukville, WI (US)

(73) Assignee: Yamato Corporation, Colorado Springs, CO (US)

( * ) Notice: Subject to any disclaimer, the term of this patent is extended or adjusted under 35 U.S.C. 154(b) by 234 days.

(21) Appl. No.: 12/261,908

(22) Filed: Oct. 30, 2008

(65) Prior Publication Data
US 2010/0108405 A1    May 6, 2010

(51) Int. Cl.
*G01G 19/387* (2006.01)
(52) U.S. Cl. .................................... 177/25.18
(58) Field of Classification Search ............... 177/25.18, 177/90, 91, 119
See application file for complete search history.

(56) References Cited

U.S. PATENT DOCUMENTS

| | | | | |
|---|---|---|---|---|
| 4,666,002 A * | 5/1987 | Haze | | 177/1 |
| 4,967,856 A * | 11/1990 | Kawanishi et al. | | 177/25.18 |
| 5,048,623 A * | 9/1991 | Toyoda | | 177/25.18 |
| 5,753,867 A * | 5/1998 | Konishi et al. | | 177/25.18 |
| 5,813,195 A * | 9/1998 | Nielsen et al. | | 53/443 |
| 5,962,816 A * | 10/1999 | Zeyer | | 177/25.18 |
| 6,066,810 A * | 5/2000 | Simionato | | 177/25.18 |
| 6,437,256 B1 * | 8/2002 | Miyamoto | | 177/25.18 |
| 7,057,118 B2 * | 6/2006 | Arnason et al. | | 177/25.18 |
| 7,063,215 B2 * | 6/2006 | Baranowski | | 209/592 |
| 7,790,990 B2 * | 9/2010 | Kieselhorst | | 177/25.18 |

FOREIGN PATENT DOCUMENTS

| | | |
|---|---|---|
| JP | 58-161829 | 9/1983 |
| JP | HEI 3-123232 | 12/1991 |

* cited by examiner

*Primary Examiner* — Randy W Gibson
(74) *Attorney, Agent, or Firm* — Marshall, Gerstein & Borun LLP

(57) ABSTRACT

A combination weigher of the present invention comprises a plurality of weighing hoppers which are capable of selectively discharging the products in a first direction or in a second direction, a collecting chute which is configured to gather the products which have been discharged from the weighing hoppers in the first direction and to discharge them, a recycle conveyor which is configured to convey the products which have been discharged from the weighing hoppers in the second direction and have been loaded onto the recycle conveyor, a feeding means configured to feed the products to the weighing hoppers, a transport means which is configured to transport the products which have been discharged from the recycle conveyor to feed the products to the feeding means, a combination calculation means which is configured to determine a discharge combination, a recycle hopper determination means configured to determine weighing hoppers whose products should be recycled, and a control means configured to cause the weighing hoppers selected to form the discharge combination to discharge the products in the first direction, and to cause the weighing hoppers determined by the recycle hopper determination means to discharge the products in the second direction.

10 Claims, 5 Drawing Sheets

COMBINATIONAL WEIGHER WITH A RECYCLE CONVEYOR CONFIGURED TO ALLOW PRODUCTS TO BE RECIRCULATED IN A DISPERSED MANNER

BACKGROUND OF THE INVENTION

1. Field of the Invention

The present invention relates to a combination weigher which includes weighing hoppers arranged in a linear shape and feeds to a packaging machine or the like products which have been weighed.

2. Description of the Related Art

Typically, products which have been weighed by a combination weigher are fed to, for example, a packaging machine, and are charged into packaging bags or packaging containers. Such a combination weigher which weighs the products is configured to include weighing hoppers arranged in a linear shape. Hereinafter, the combination weigher including the weighing hoppers arranged in a linear shape will be described.

In such a conventional combination weigher, for example, below the plurality of weighing hoppers arranged in a linear shape, a collecting chute is provided to gather the products which have been discharged from the weighing hoppers and to feed them to, for example, a feed inlet of a packaging machine. Each weighing hopper measures the weight of the products which have been fed thereto. For example, a controller performs combination calculation based on the measured values to determine one combination of weighing hoppers in which a total of the measured value falls within an allowable range with respect to a target combination weight and to determine it as a combination (hereinafter referred to as a "discharge combination") for discharging the products. The weighing hoppers selected to form the discharge combination discharge the products. The discharged products slide down on the collecting chute and are fed into, for example, the feed inlet of the packaging machine.

Japanese Patent Application Publication No. Sho 58-161829 (hereinafter referred to as "document 1") discloses a configuration in which a sorting device is disposed below a plurality of weighing hoppers arranged in a linear shape to route in two directions products which have been discharged from these plurality of weighing hoppers, a collecting chute is disposed below the sorting device to discharge the products in weighing hoppers selected to form a discharge combination, and a chute (hereinafter referred to as "defective product discharge chute A") is disposed below the sorting device to discharge the products from, for example, a weighing hopper holding the products with an excess amount. In this case, the sorting device routes the products which have been discharged from the weighing hoppers to the collecting chute or to the defective product discharge chute A.

Japanese Utility Model Application Publication No. Hei. 3-123232 (hereinafter referred to as "document 2") discloses that the products which are sent out from a supplying device are fed via linear feeders and others, a plurality of containers (hereinafter referred to as "weighing containers") are arranged in a linear shape to measure the weights of the products, a collecting chute is disposed below these plurality of weighing containers to discharge to a packaging machine the products from the weighing containers selected to form a discharge combination, and a funnel-shaped chute (hereinafter referred to as "defective product discharge chute B") is disposed below these plurality of weighing containers to discharge the products from, for example, a weighing container accommodating the products with an excess amount. In addition, this Utility Model discloses a configuration in which below a discharge outlet of the defective product discharge chute B, a belt conveyor is disposed to convey the products which have been discharged from the discharge outlet and to return them to a supplying device. In this case, the weighing containers are configured to be rotatable such that openings of the weighing containers face upward, downward, leftward, and rightward. With the openings facing upward, the products are fed to the weighing containers. For example, with the openings facing leftward and downward, the products are discharged onto the collecting chute, while with the openings facing rightward and downward, the products are discharged onto the defective product discharge chute B.

In the above described combination weigher, in the case of, for example, products which have a tendency to stick together, they sometimes stick together and are fed to the weighing hopper with a large amount at a time. For example, a weighing hopper which is fed with the products with an amount that is larger than an upper limit value of an allowable range with respect to a target combination weight, is not selected for the discharge combination. In a case where favorable combination weighing accuracy is obtained by setting the number of weighing hoppers selected to form the discharge combination to four in average, the operation is set so that the target feed amount for the weighing hopper is ¼ or substantially ¼ of the target combination weight. It is difficult to select for the discharge combination the weighing hopper which is fed with the products whose amount is significantly larger than the target feed amount, for example, twice as large as the target feed amount. This is because, if such a weighing hopper participates in a combination within a predetermined weight range, then the number of other weighing hoppers which can participate in the combination becomes smaller.

In a case where a package containing a predetermined number of products is manufactured, a combination of weighing hoppers in which a total weight of the products falls within the allowable range with respect to the target combination weight and a total number of the products is a predetermined number is determined as the discharge combination. In this case, when the products are fed to the weighing hopper with a large amount and the products whose number is larger than the predetermined number are fed to the weighing hopper as described above, this weighing hopper is not selected for the discharge combination. For example, in a case where favorable combination weighing accuracy is attained by setting the number of weighing hoppers selected to form the discharge combination to four in average and a package containing a smaller number, for example, seven pieces of products is manufactured, each weighing hopper must be configured to be fed with one to two pieces of products. For example, if a weighing hopper is fed with eight pieces of products, then the weighing hopper is not selected for the discharge combination.

If the weighing hopper which is fed with the products with an excess amount (hereinafter referred to as an "excess product weighing hopper") as described above increases in number, then it becomes impossible to determine the discharge combination. Accordingly, to eliminate the excess product weighing hopper, the products must be discharged from the excess product weighing hopper.

In the configuration disclosed in the document 1, the products can be discharged from the excess product weighing hopper through the defective product discharge chute A. However, to weigh the products which have been discharged from the defective product discharge chute A again, an operator must return the products to the supplying device. In addition, the sorting device is not provided for each weighing hopper but is provided for all of the weighing hoppers. Therefore, when the products are discharged from the excess product weighing hopper, the weighing hopper selected to form the discharge combination must stop discharging for a moment, causing a reduced productive capacity.

In the configuration disclosed in the document 2, the products can be discharged from the weighing container (hereinafter referred to as "excess product weighing container") holding the products with an excess amount through the defective product discharge chute B, and the belt conveyor conveys the products which have been discharged from the defective product discharge chute B and returns them to the supplying device. However, in a case where there are plural excess weighing containers at the same time, the products are discharged from the discharge outlet of the funnel-shaped defective product discharge chute B with a very large amount and are conveyed in a clumped state by the belt conveyor to be supplied to the supplying device. For this reason, in the case of the products which have a tendency to stick together, they might stick together on the supplying device and might be fed to again the weighing container with a large amount in a sticky state.

In the configuration disclosed in document 1, the sorting device is provided below the weighing hoppers, while in the configuration disclosed in document 2, the weighing containers are configured to be rotatable, to discharge the products selectively to the collecting chute or to the defective product discharge chute (A, B). However, in either case, the configuration for sorting the products is not easy.

SUMMARY OF THE INVENTION

The present invention has been made with a view to solving the above described problem, and an object of the present invention is to provide a combination weigher which is capable of recycling products from a weighing hopper which is not selected for a discharge combination or from a weighing hopper which is difficult to select for the discharge combination, and is capable of feeding the recycled products in a dispersed state again even when there are at the same time plural weighing hoppers whose products should be recycled, without manual intervention and without reducing a productive capacity.

With a view to achieving the above described objective, a combination weigher of the present invention comprises a plurality of weighing hoppers which are arranged in a linear shape, are each configured to hold products, and are each provided with a first discharge gate for discharging the products in a first direction and a second discharge gate for discharging the products in a second direction, the first direction and the second direction being perpendicular to a direction in which the weighing hoppers are arranged, the weighing hoppers being each configured to measure weight of the products which are held therein; a collecting chute which is positioned below the weighing hoppers, the collecting chute being configured to gather the products which have been discharged from the weighing hoppers in the first direction and to discharge the products from a discharge outlet at a bottom part thereof; a recycle conveyor which is positioned below the weighing hoppers so as to extend along all of the weighing hoppers, the recycle conveyor being configured to convey, in a direction parallel to the direction in which the weighing hoppers are arranged, the products which have been discharged from the weighing hopper in the second direction and have been loaded onto the recycle conveyor; a feeding means configured to feed the products to the weighing hoppers; a transport means which is configured to transport the products which have been discharged from the recycle conveyor to feed the products to the feeding means; a combination calculation means which is configured to determine a discharge combination which is a combination of weighing hoppers holding the products whose total weight falls within a predetermined weight range; a recycle hopper determination means configured to determine a weighing hopper whose products should be recycled, based on a predetermined recycle condition; and a control means configured to cause the weighing hoppers selected to form the discharge combination to discharge the products in the first direction, and to cause the weighing hopper determined by the recycle hopper determination means to discharge the products in the second direction.

In accordance with such a configuration, the products which have been discharged in the first direction from the weighing hoppers selected to form the discharge combination are discharged onto the collecting chute and are fed from the discharge outlet of the collecting chute to, for example, a feed inlet of a packaging machine. On the other hand, the products which have been discharged in the second direction from the weighing hopper determined by the recycle hopper determination means based on the predetermined recycle condition are discharged onto the recycle conveyor. For example, the predetermined recycle condition may be set such that the weight of the products which are held in the weighing hopper is a predetermined weight or larger. Under the condition, the weighing hopper which is fed with the products with an excess amount and is not selected for the discharge combination or is difficult to select for the discharge combination, is determined, so that the products can be discharged from these weighing hoppers onto the recycle conveyor. Furthermore, the products which have been discharged onto the recycle conveyor can be fed to the weighing hopper again via the transport means and the feeding means. That is, by providing the recycle conveyor, the transport means, and the feeding means and configuring the weighing hopper so that it is capable of discharging the products selectively to the collecting chute or to the recycle conveyor, the products in the weighing hopper which is not selected for the discharge combination or from the weighing hopper which is difficult to select for the discharge combination can be recycled by the recycle conveyor, and the recycled products can be fed again via the transport means and the feeding means, without manual intervention and without reducing a productive capacity. In addition, the recycle conveyor is disposed to extend along all of the weighing hoppers. Therefore, even if there are at the same time plural weighing hoppers whose products should be recycled and the products are discharged from these plural weighing hoppers at the same time, the products which have been discharged from the weighing hoppers can be loaded in different positions onto the recycle conveyor and can be recycled in a dispersed state, so that the products can be fed again in a dispersed state. Moreover, by using the weighing hopper having the first discharge gate and the second discharge gate, the products which have been discharged from the weighing hoppers can be sorted to be routed to the collecting chute or to the recycle conveyor with a simple configuration.

The feeding means may include a plurality of feeding hoppers which are arranged in a linear shape above the weighing hoppers, the feeding hoppers being configured to hold the products and to then feed the products to the weighing hoppers; and a plurality of linear feeders which are positioned above the feeding hoppers and are configured to feed the products to the feeding hoppers; and a dispersion feeder configured to disperse the products to feed the products to the plurality of linear feeders. The transport means may be configured to feed, to the dispersion feeder, the products which have been discharged from the recycle conveyor.

In accordance with such a configuration, the products which have been discharged from the recycle conveyor can be fed to the vibration feeder again.

The feeding means may include a plurality of feeding hoppers which are arranged in a linear shape above the weighing hoppers, the feeding hoppers being configured to hold the products and to then feed the products to the weighing hoppers; a plurality of linear feeders which are positioned above the feeding hoppers and are configured to feed the products to the feeding hoppers; a dispersion feeder configured to disperse the products to feed the products to the plurality of linear feeders; and a vibration feeder which is configured to convey the products to feed the products to the dispersion feeder. The transport means may be configured to feed, to the vibration feeder, the products which have been discharged from the recycle conveyor.

In accordance with such a configuration, the products which have been discharged from the recycle conveyor can be fed to the vibration feeder again.

The recycle conveyor may include a belt conveyor.

The control means may be configured to, when the recycle hopper determination means determines that there are at the same time plural weighing hoppers whose products should be recycled, cause all of the weighing hoppers determined by the recycle hopper determination means to discharge the products in the second direction at the same time.

In accordance with such a configuration, since the plurality of weighing hoppers whose products should be recycled are caused to discharge the products in the second direction at the same timing, a control therefor is easy. In addition, since the recycle conveyors are disposed to extend along all of the weighing hoppers, the products can be recycled in a dispersed state and can be fed in a dispersed state again, even when the products are discharged from the plurality of weighing hoppers at the same time.

The predetermined recycle condition may be such that a weight of the products which are held in the weighing hopper has a predetermined weight value or larger which is larger than a target feed amount for the weighing hopper.

In this case, the weighing hopper holding the products whose weight is not smaller than the predetermined weight value is determined as the weighing hopper whose products should be recycled. In this case, by setting the predetermined weight value to an appropriate value, for example, a value that is twice as large as the target feed amount for the weighing hopper, the weighing hopper which is not selected for the discharge combination or the weighing hopper which is difficult to select for the discharge combination is determined as the weighing hopper whose products should be recycled.

The predetermined recycle condition may be such that a weight of the products which are held in the weighing hopper has a value which is larger than an upper limit value in the predetermined weight range.

In this case, the weighing hopper which is fed with the products with an excess amount and therefore is not selected for the discharge combination is determined as the weighing hopper whose products should be recycled.

The combination calculation means may be configured to determine a discharge combination which is a combination of the weighing hoppers which hold the products whose total weight falls within a predetermined weight range and whose total number is a target number. The recycle hopper determination means may be configured to determine that the predetermined recycle condition is such that the number of the products which are held in the weighing hopper is a predetermined number or larger.

In this case, the weighing hopper holding the products whose number is not smaller than the predetermined number is determined as the weighing hopper whose products should be recycled. By setting the predetermined number to an appropriate value, for example, a value (e.g., value that is twice as large as the target feed number) that is larger than the target feed number which is the number of the products which would be fed to the weighing hopper, the weighing hopper which is not selected for the discharge combination or the weighing hopper which is difficult to select for the discharge combination can be determined as the weighing hopper whose products should be recycled. In this case, for example, the combination calculation means may be configured to calculate the number of products which are held in the weighing hopper based on the weight of the products which are held in the weighing hopper and a predetermined weight of one piece of product.

The combination calculation means may be configured to determine a discharge combination which is a combination of the weighing hoppers which hold the products whose total weight falls within a predetermined weight range and whose total number is a target number. The recycle hopper determination means may be configured to determine that the predetermined recycle condition is such that the number of the products which are held in the weighing hopper is larger than the target number.

In this case, the weighing hopper which is fed with the products with an excess amount and is not selected for the discharge combination is determined as the weighing hopper whose products should be recycled. In this case, for example, the combination calculation means may be configured to calculate the number of products which are held in the weighing hopper based on the weight of the products which are held in the weighing hopper and a predetermined weight of one piece of product.

The predetermined recycle condition may be such that the weighing hopper is not selected for the discharge combination during a predetermined time period or longer.

In this case, the weighing hopper which is not selected for the discharge combination during the predetermined time period or longer is determined as the weighing hopper whose products should be recycled. By setting the predetermined time to an appropriate value, the weighing hopper which is not selected for the discharge combination or the weighing hopper which is difficult to select for the discharge combination can be determined as the weighing hopper whose products should be recycled.

The present invention has the above described configuration, and achieves an advantage that the combination weigher is capable of recycling products in a weighing hopper which is not selected for a discharge combination or in a weighing hopper which is difficult to select for the discharge combination and of feeding the recycled products again in a dispersed state even when there are at the same time plural weighing hoppers whose products should be recycled, without manual intervention and without reducing a productivity The above and further products, features and advantages of the present invention will more fully be apparent from the following detailed description of preferred embodiments with accompanying drawings.

DETAILED DESCRIPTION OF THE PREFERRED EMBODIMENTS

Hereinafter, an embodiment of the present invention will be described with reference to the drawings.

Figure 1:
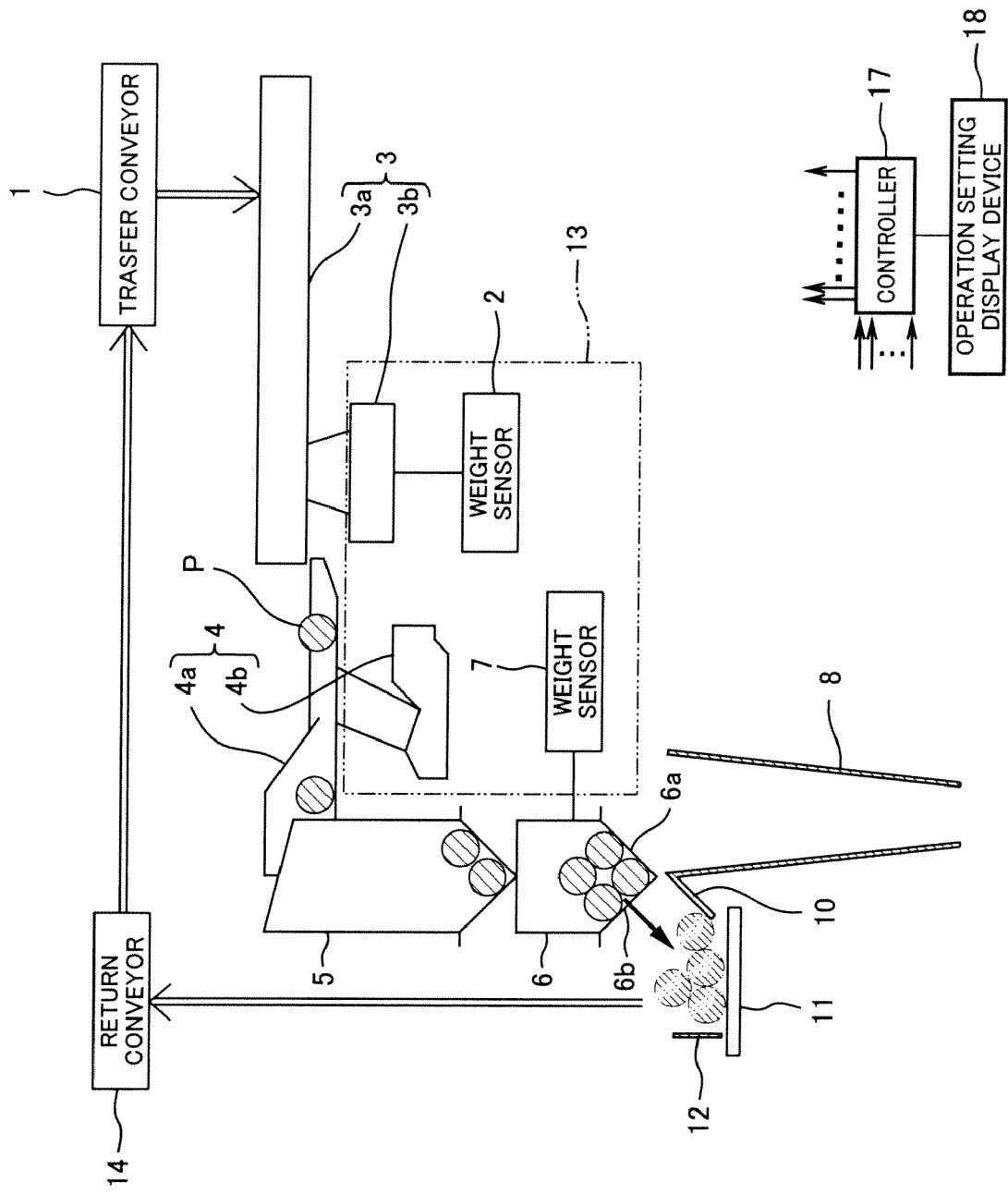
FIG. 1 is a schematic view showing a configuration of a combination weigher according to an embodiment of the present invention.
Figure 2:
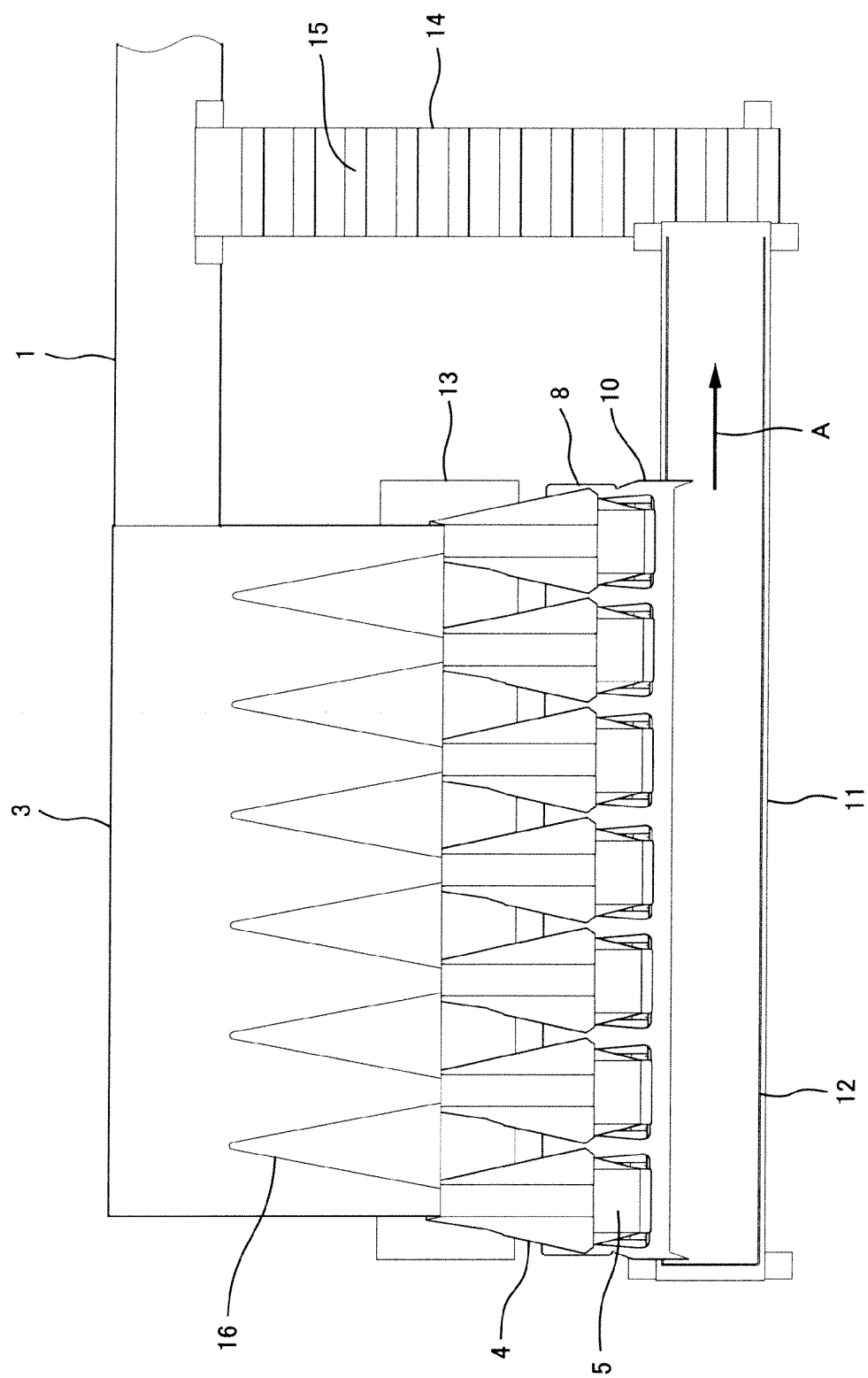
FIG. 2 is a plan view of the combination weigher according to the embodiment of the present invention.
Figure 3:
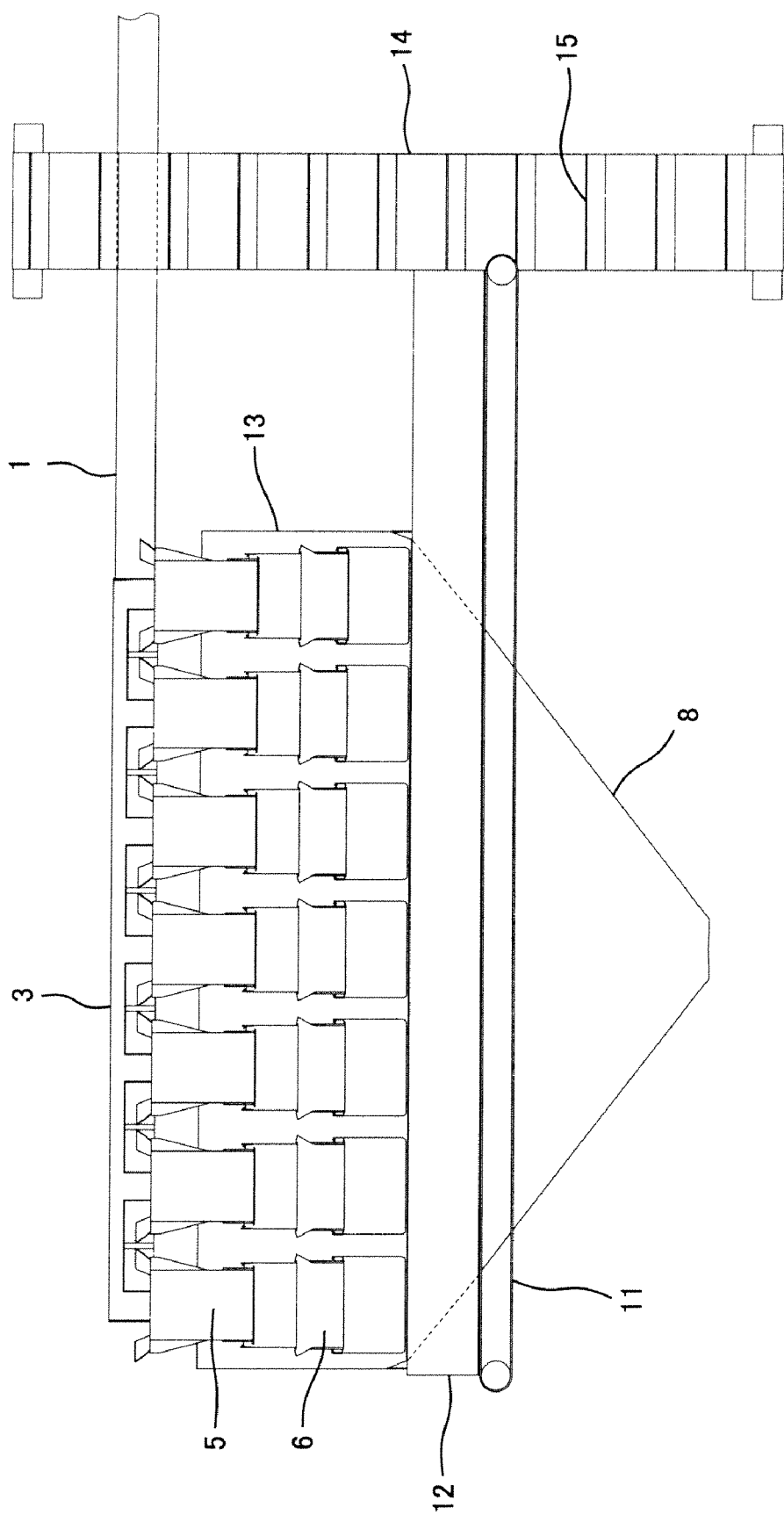
FIG. 3 is a front view of the combination weigher according to the embodiment of the present invention.
Figure 4:
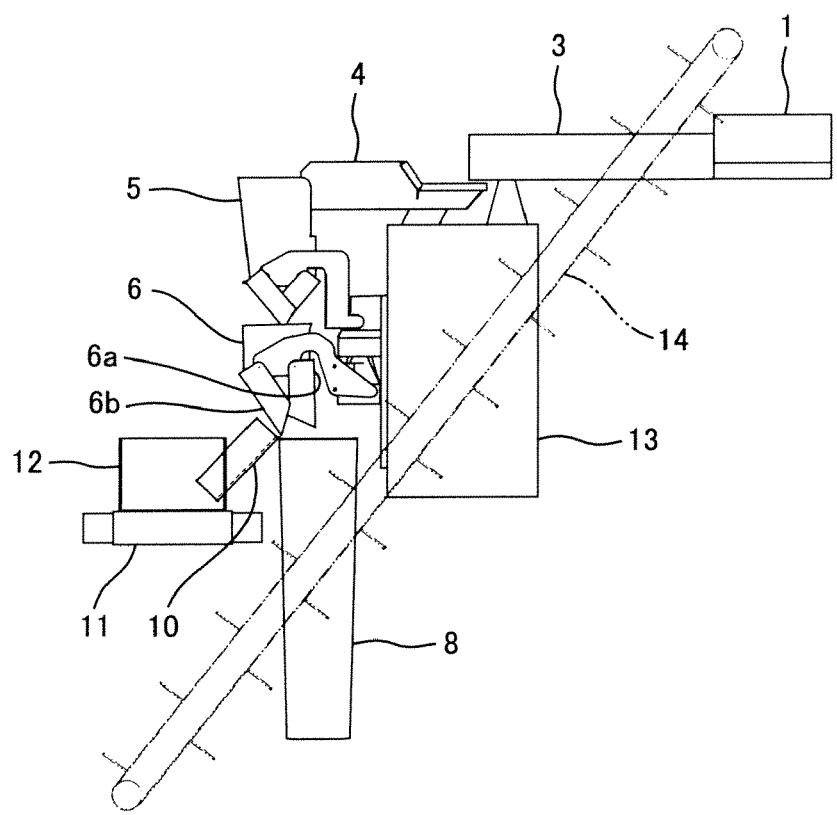
FIG. 4 is a side view of the combination weigher according to the embodiment of the present invention.
Figure 5:
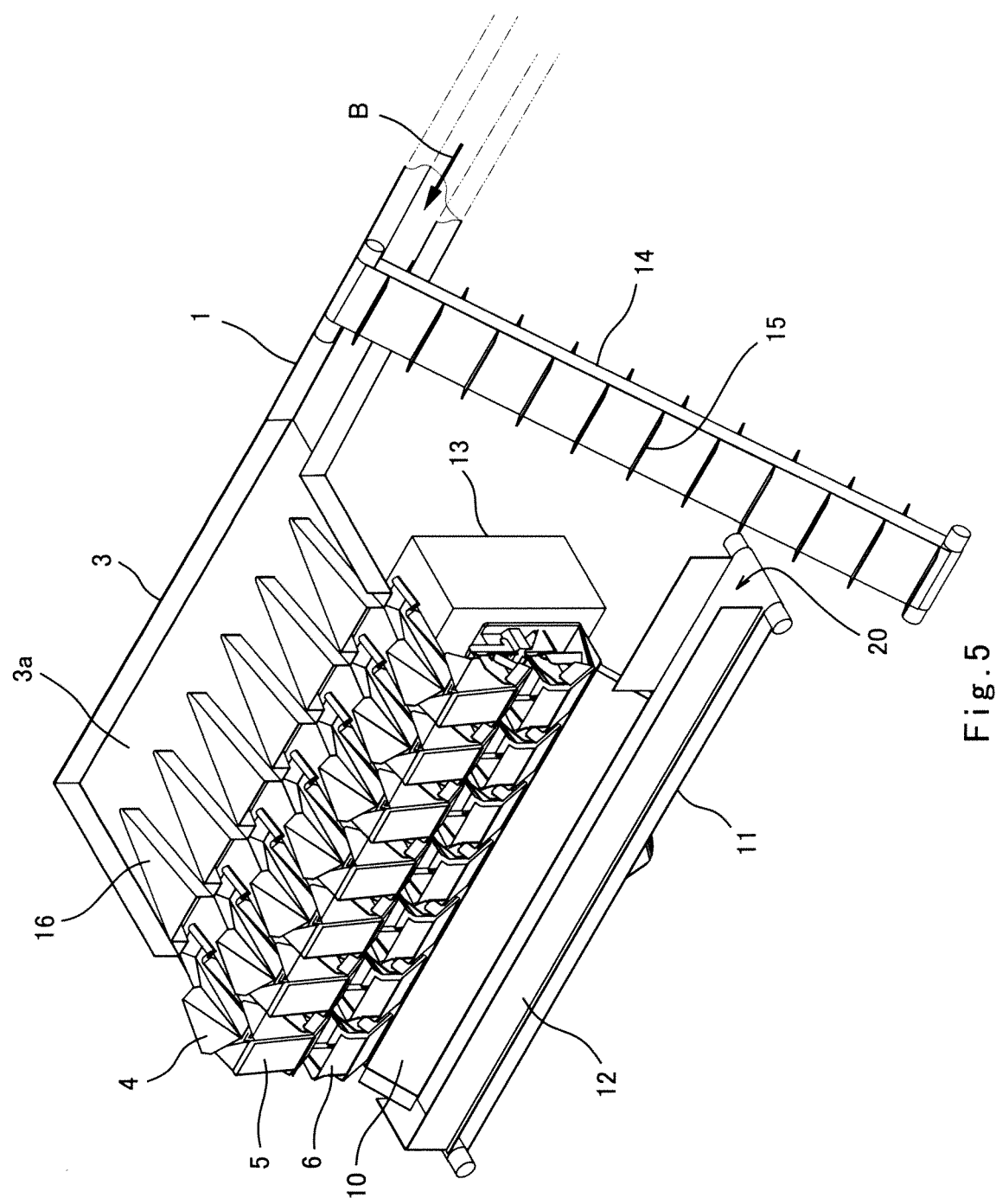
FIG. 5 is a perspective view of the combination weigher according to the embodiment of the present invention as viewed from above.

FIG. 1 is a schematic view showing a configuration of a combination weigher according to an embodiment of the present invention. FIG. 2 is a plan view of the combination weigher. FIG. 3 is a front view of the combination weigher. FIG. 4 is a side view of the combination weigher. FIG. 5 is a perspective view of the combination weigher as viewed from above.

The combination weigher according to this embodiment includes a transfer conveyor 1 which is supplied with products. The transfer conveyor 1 is constituted by, for example, a vibration feeder. The transfer conveyor 1 vibrates to transfer to the dispersion feeder 3 the products which are supplied from a means which is not shown. The dispersion feeder 3 includes a tray 3a onto which the products are loaded and a vibrator 3b for vibrating the tray 3a. The dispersion feeder 3 vibrates to disperse the products which have been fed from the transfer conveyor 1 and to transfer them to a plurality of linear feeders 4. The tray 3a of the dispersion feeder 3 is provided with, for example, partition portions 16 for guiding the products to inlets of respective of the linear feeders 4. The plurality of linear feeders 4 are arranged side by side so that the products are transported in a parallel direction. The linear feeders 4 vibrate to transport the products which have been transferred from the dispersion feeder 3 to feed them to respective of the feeding hoppers 5. Each linear feeder 4 includes a trough 4a onto which the products are loaded and a vibrator 4b for vibrating the trough 4b.

Below tip end portions of the linear feeders 4, feeding hoppers 5 are provided. Below the feeding hoppers 5, weighing hoppers 6 are provided. The plurality of feeding hoppers 5 are arranged in a linear shape and the plurality of weighing hoppers 6 are arranged in a linear shape. The feeding hopper 5 receives the products which have been transferred from the linear feeder 4, and opens its gate to feed the products to the weighing hopper 6 positioned therebelow when the weighing hopper 6 is empty. Each weighing hopper 6 is attached with a weight sensor 7 such as a load cell for measuring the weight of the products inside the weighing hopper 6. Each weight sensor 7 outputs a measured value to a controller 17.

Each weighing hopper 6 has an inner gate (first discharge gate) 6a for discharging the products in an inward direction (first direction) and an outer gate (second discharge gate) 6b for discharging the products in an outward direction (second direction). When the inner gate 6a is opened, the products are discharged onto the collecting chute 8, while when the outer gate 6b is opened, the products are discharged onto a recycle conveyor 11. Thus, by using the weighing hopper 6 having the two discharge gates (6a, 6b), the products which have been discharged from the weighing hopper 6 can be sorted to be routed to the collecting chute 8 or to the recycle conveyor 11 with a simple configuration. In this embodiment, the direction toward the base body 13 from the perspective of the weighing hoppers 6 is defined as the inward direction and its opposite direction is referred to the outward direction.

Below and inward the weighing hoppers 4 arranged in a linear shape, a collecting chute 8 having a substantially inverted truncated quadrangular pyramid shape is disposed. Below the collecting chute 8, for example, a feed inlet of a packaging machine (not shown) is positioned. The products which have been discharged from a discharge outlet at a bottom part of the collecting chute 8 are fed to the packaging machine and are charged into bags.

The dispersion feeder 3 is attached with, for example, a weight sensor 2 such as a load cell to detect an amount of the products on the dispersion feeder 3. A detection signal is sent to the controller 17. The controller 17 controls the transfer conveyor 1 based on the detection signal from the weight sensor 2 so that the products on the dispersion feeder 3 is maintained at a specified amount.

The dispersion feeder 3 and the linear feeders 4 are mounted to an upper portion of the base body 13. The feeding hoppers 5 and the weighing hoppers 6 are mounted to a side surface of the base body 13. Inside the base body 13, drive units such as the vibrator 3b of the dispersion feeder, the vibrators 4b of the linear feeders, gate opening and closing devices for the feeding hoppers 5 and the weighing hoppers 6, etc), the weight sensors 2 and 7, etc are accommodated.

Below the weighing hoppers 6 on the opposite side of the collecting chute 8, a recycle conveyor 11 is disposed to convey the products which have been discharged in the outward direction from the weighing hopper 6 and have been loaded onto the recycle conveyor 11. Between the recycle conveyor 11 and the weighing hopper 6, a guide plate 10 which also serves as a chute is disposed so as not to contact the recycle conveyor 11 and the weighing hoppers 6. The products which have been discharged in the outward direction from the weighing hopper 6 slide down on the guide plate 10 and are loaded onto the recycle conveyor 11. The guide plate 10 is attached to the collecting chute 8. At edge portions of the recycle conveyor 11 except for a discharge outlet 20 (FIG. 5) of the recycle conveyor 11 and a portion of the recycle conveyor 11 where the guide plate 10 is provided, guide plates 12 are provided to inhibit the products from being ejected out of the recycle conveyor 11. The guide plates 12 are provided to extend vertically with a gap so as not to contact the recycle conveyor 11.

The recycle conveyor 11 is constituted by, for example, a belt conveyor, and conveys the products in a direction indicated by an arrow A in FIG. 2. The products which have been conveyed by the recycle conveyor 11 are discharged onto a return conveyor 14.

The return conveyor 14 is, as shown in FIGS. 2 to 5, constituted by, for example, a belt conveyor with crosspieces which is provided with cross pieces 15 which are arranged to be spaced apart from each other. The return conveyor 14 conveys obliquely upward the products which have been conveyed by the recycle conveyor 11 to transfer them to the transfer conveyor 1. The products which have been transferred from the return conveyor 14 to the transfer conveyor 1 are allowed to get together with the products which are supplied through a normal route in a transport direction indicated by an arrow B and are supplied to the dispersion feeder 3 again. As the return conveyor 14, a bucket conveyor having a structure in which a number of buckets are attached to an endless belt to be spaced apart from each other may be used. The return conveyor 14 and the transfer conveyor 1 may have other structures and thus can be altered in various ways. The return conveyor 14 may be configured to directly supply the products to the dispersion feeder 3.

The controller 17 is constituted by, for example, a microcomputer. The controller 17 controls the entire combination weigher including the recycle conveyor 11, the return conveyor 14, and the transfer conveyor 1 and performs a combination process to determine a combination of weighing hoppers 6 which should discharge the products. In this combination process, combination calculation is performed based on measured values of the weighing hoppers 6 (weight values of the products inside the weighing hoppers 6 which are measured by the weight sensors 7), and one combination of weighing hoppers 6 in which a total of the measured values (a total of weights of the products) falls within an allowable range (predetermined weight range) with respect to a target combination weight and an absolute value of a difference between the total and the target combination weight is smallest is selected from among a plurality of weighing hoppers 6 and is determined as a combination (hereinafter referred to as "discharge combination") for discharging the products. The controller 17 serves as not only a combination calculation means, a control means, and the like, but a recycle hopper determination means which determines a recycle weighing hopper 6 as described later.

An operation setting display device 18 is configured to include, for example, a touch panel. The operating setting display device 18 includes an input means with which the operation of the combination weigher and the associated operating parameters are set, updated, etc, and a display means which displays on a screen, an operation speed, the combination weight value which is a total of the measured values of the weighing hoppers 6 selected to form the discharge combination, and others.

In FIG. 1, for convenience, the products P are illustrated as having a spherical shape. The products may have any other shapes including an intricate shape.

Subsequently, the operation of the combination weigher configured as described above will be described. The operation of the combination weigher is executed under control of the controller 17.

Initially, the products are transported by the transfer conveyor 1 and are loaded onto the dispersion feeder 3. Then, the products are dispersed by vibration of the dispersion feeder 3 and are transferred to each linear feeder 4. Then, the products are transferred by vibration of the linear feeder 4 toward a tip end of the linear feeder 4. The products are discharged from the tip end of the linear feeder 4 and are fed to the feeding hopper 5. When the weighing hopper 6 located below each feeding hopper 5 is empty, the products are fed from the feeding hopper 5 to the weighing hopper 6. The controller 17 executes the above described combination process, and causes the weighing hoppers 6 selected to form the discharge combination to open the inner gates 6a to discharge the products onto the collecting chute 8. The products which have been discharged from the weighing hoppers 6 slide down on the collecting chute 8 and are fed to, for example, the feed inlet of the packaging machine. The above described operation is repeated.

Furthermore, in this embodiment, the controller 17 determines whether or not there is a weighing hopper 6 (weight value of the products inside the weighing hopper 6) the measured value of which is not smaller than a predetermined weight (Wa) and which is not selected for the discharge combination, every time it executes the combination process. If it is determined that there is such a weighing hopper 6, the controller 17 determines that the weighing hopper 6 is a hopper whose products should be recycled (hereinafter referred to as "recycle weighing hopper 6.") The controller 17 causes the recycle weighing hopper 6 to open the outer gate 6b to discharge the products, while driving the recycle conveyor 11 and the return conveyor 14. The products which have been discharged from the recycle weighing hopper 6 slide down on the guide plate 10 and are loaded onto the recycle conveyor 11. The products are transported in the direction as indicated by the arrow A in FIG. 2 and are discharged from the discharge outlet 20 of the recycle conveyor 11 onto the return conveyor 14. Then, the products are fed from the return conveyor 14 to the transfer conveyor 1 again.

The weighing hoppers 6 selected to form the discharge combination and the recycle weighing hopper 6 may discharge the products at the same timings or at different timings.

The value of the predetermined weight Wa is stored in a memory of the controller 17. An operator can set or change the value of the predetermined weight Wa by operating the operation setting display device 18. The predetermined weight Wa may be set to, for example, a minimum value that is above an upper limit value in the allowable range with respect to the target combination weight. In this case, only a weighing hopper which is not selected for the discharge combination is selected as the recycle weighing hopper 6. Alternatively, the predetermined weight Wa may be set to a value that is not larger than the upper limit value of the allowable range with respect to the target combination weight and is significantly larger than a target feed amount for the weighing hopper 6. For example, the predetermined weight Wa may be set to a weight value that is twice as large as that of the target feed amount for the weighing hopper 6. Or, if the weight value that is ½ of the target combination weight is larger than the target feed amount for the weighing hopper 6, then the predetermined weight Wa may be set to a weight value that is ½ of the target combination weight. In this case, a weighing hopper which is difficult to select for the discharge combination, in addition to the weighing hopper which is not selected for discharge combination, are selected as the recycle weighing hopper 6.

In the combination process, the controller 17 may be configured to determine as a discharge combination, a combination of weighing hoppers 6 in which a total of measured values of the weighing hoppers 6 falls within an allowable rage with respect to a target combination weight and a total number of the products which are held therein is equal to a target number (N). In this case, the number of products which are held in each weighing hoppers 6 may be obtained by dividing the measured value of the weighing hopper 6 by the preset weight value (Ws) of one piece of product and rounding off fractional parts. In this case, in the manner described above, the controller 17 may be configured to determine as the recycle weighing hopper 6 a weighing hopper 6 having a measured value that is not smaller than the predetermined weight (Wa) and not being selected for the discharge combination, every time it executes the combination process. Alternatively, the controller 17 may be configured to determine as the recycle weighing hopper 6 a weighing hopper 6 holding the products whose number is not smaller than a predetermined number M and not being selected for the discharge combination, every time it executes the combination process. As used herein, the phrase that the weighing hopper 6 holding the products whose number is not smaller than a predetermined number M is substantially the same as the fact that the measured value of the weighing hopper 6 is not smaller than the predetermined weight Wa, when Wa=Ws×M. Ws indicates the preset weight value of one piece of product.

The value of the predetermined number M is stored in the memory in the controller 17. The operator can set or change the value of the predetermined number M by operating the operation setting display device 18.

When the predetermined number M is (N+1), only the weighing hopper which is not selected for the discharge combination is selected as the recycle weighing hopper 6. Alternatively, the predetermined number M may be set to a value that is not larger than a target number N and is significantly larger than a target feed number corresponding to the target feed amount for the weighing hopper 6. For example, the predetermined number M may be set to a number (number that is twice as large as the target feed number) corresponding to the weight value that is twice as large as the target feed amount for the weighing hopper 6. Or, if the weight value that is ½ of the target combination weight is larger than the target feed amount for the weighing hopper 6, then the predetermined number M may be set to a number corresponding to the weight value of ½ of the target combination weight. In this case, the weighing hopper which is difficult to select for the discharge combination in addition to the weighing hopper which is not selected for the discharge combination are selected as the recycle weighing hopper 6.

In this embodiment, the recycle conveyor 11 is provided obliquely below the weighing hoppers 6, the return conveyor 14 is provided to feed to the transfer conveyor 1 the products which have been discharged from the recycle conveyor 11, and the weighing hopper 6 is capable of selectively discharging the products in either one of the two directions, i.e., toward the collecting chute 8 or toward the recycle conveyor 11. With such a configuration, the products can be discharged from the weighing hopper 6 which is not selected for the discharge combination or from the weighing hopper 6 which is difficult to select for the discharge combination, onto the recycle conveyor 11, and further the return conveyor 14 can feed again to the transfer conveyor 1 the products which have been discharged from the recycle conveyor 11, without manual intervention and without reducing a productive capacity.

The controller 17 is configured to, if there are plural recycle weighing hoppers 6 at the same time, cause all of these weighing hoppers 6 to discharge the products at the same time. Since the products are discharged from all of the recycle weighing hoppers 6 at the same time, the control therefor is easy. In addition, since the recycle conveyor 11 is disposed to extend along all of the weighing hoppers 6 and the recycle conveyor 11 conveys the products in the direction parallel to the direction in which the weighing hoppers 6 are arranged, the products inside the plurality of recycle weighing hoppers 6 are loaded in different positions onto the recycle conveyor 11 in a dispersed manner and are transferred in a dispersed manner from the recycle conveyor 11 to the transfer conveyor 1 through the return conveyor 14, even when the products are discharged from the plurality of recycle weighing hopper 6 at the same time. That is, since the products which are discharged from the plurality of recycle weighing hoppers 6 at the same time can be fed in the dispersed manner to the transfer conveyor 1 again, it is possible to suppress occurrence of an event that the products stick together on the transfer conveyor 1, the dispersion feeder 3, or the linear feeder 4 and hence a large amount of products in a sticky state are fed to the weighing hopper 6.

Alternatively, a weighing hopper 6 which is not selected for the discharge combination during a predetermined time (t1) or longer may be selected as the recycle weighing hopper 6. In this case, by setting the predetermined time t1 to an appropriate value, the products which are held in the weighing hopper 6 which is not selected for the discharge combination or the weighing hopper 6 which is difficult to select for the discharge combination can be discharged from these weighing hoppers 6 onto the recycle conveyor 11. In this case, the value of the predetermined time t1 is stored in the memory of the controller 17. The operator can set and change the value of the predetermined time t1 by operating the operation setting display device 18.

The controller 17 is not limited to being configured as the single control apparatuses, but instead may be configured to include a plurality of control apparatuses which are disposed in a distributed manner and co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

The invention claimed is:

1. A combination weigher comprising:
a plurality of weighing hoppers which are arranged in a linear shape, are each configured to hold products, and are each provided with a first discharge gate for discharging the products in a first direction and a second discharge gate for discharging the products in a second direction, the first direction and the second direction being perpendicular to a direction in which the weighing hoppers are arranged, the weighing hoppers being each configured to measure weight of the products which are held therein;
a collecting chute which is positioned below the weighing hoppers, the collecting chute being configured to gather the products which have been discharged from the weighing hoppers in the first direction and to discharge the products from a discharge outlet at a bottom part thereof;
a recycle conveyor which is positioned below the weighing hoppers so as to extend along all of the weighing hoppers, the recycle conveyor being configured to convey, in a direction parallel to the direction in which the weighing hoppers are arranged, the products which have been discharged from the weighing hopper in the second direction and have been loaded onto the recycle conveyor;
a feeding means configured to feed the products to the weighing hoppers;
a transport means which is configured to transport the products which have been discharged from the recycle conveyor to feed the products to the feeding means;
a combination calculation means which is configured to determine a discharge combination which is a combination of weighing hoppers holding the products whose total weight falls within a predetermined weight range;
a recycle hopper determination means configured to determine a weighing hopper whose products should be recycled, based on a predetermined recycle condition; and
a control means configured to cause the weighing hoppers selected to form the discharge combination to discharge the products in the first direction, and to cause the weighing hopper determined by the recycle hopper determination means to discharge the products in the second direction, and
wherein the transport means is configured to transport the products, which have been loaded in different positions onto the recycle conveyor in a dispersed manner, in a dispersed manner to the feeding means when the products are discharged from the recycle conveyor.

2. The combination weigher according to claim 1, wherein the feeding means includes:
a plurality of feeding hoppers which are arranged in a linear shape above the weighing hoppers, the feeding hoppers being configured to hold the products and to then feed the products to the weighing hoppers;
a plurality of linear feeders which are positioned above the feeding hoppers and are configured to feed the products to the feeding hoppers; and
a dispersion feeder configured to disperse the products to feed the products to the plurality of linear feeders;
wherein the transport means is configured to feed, to the dispersion feeder, the products which have been discharged from the recycle conveyor.

3. The combination weigher according to claim 1, wherein the feeding means includes:
a plurality of feeding hoppers which are arranged in a linear shape above the weighing hoppers, the feeding hoppers being configured to hold the products and then to feed the products to the weighing hoppers;
a plurality of linear feeders which are positioned above the feeding hoppers and are configured to feed the products to the feeding hoppers;
a dispersion feeder configured to disperse the products to feed the products to the plurality of linear feeders; and
a vibration feeder which is configured to convey the products to feed the products to the dispersion feeder;
wherein the transport means is configured to feed, to the vibration feeder, the products which have been discharged from the recycle conveyor.

4. The combination weigher according to claim 1, wherein the recycle conveyor, includes a belt conveyor.

5. The combination weigher according to claim 1, wherein the control means is configured to, when the recycle hopper determination means determines that there are at the same time plural weighing hoppers whose products should be recycled, cause all of the weighing hoppers determined by the recycle hopper determination means to discharge the products in the second direction at the same time.

6. The combination weigher according to claim 1, wherein the predetermined recycle condition is such that a weight of the products which are held in the weighing hopper has a predetermined weight value or larger which is larger than a target feed amount for the weighing hopper.

7. The combination weigher according to claim 1, wherein the predetermined recycle condition is such that a weight of the products which are held in the weighing hopper has a value which is larger than an upper limit value in the predetermined weight range.

8. The combination weigher according to claim 1, wherein
the combination calculation means is configured to determine a discharge combination which is a combination of the weighing hoppers which hold the products whose total weight falls within a predetermined weight range and whose total number is a target number; and
wherein the recycle hopper determination means is configured to determine that the predetermined recycle condition is such that the number of the products which are held in the weighing hopper is a predetermined number or larger.

9. The combination weigher according to claim 1, wherein
the combination calculation means is configured to determine a discharge combination which is a combination of the weighing hoppers which hold the products whose total weight falls within a predetermined weight range and which hold the products whose total number is a target number; and
wherein the recycle hopper determination means is configured to determine that the predetermined recycle condition is such that the number of the products which are held in the weighing hopper is larger than the target number.

10. The combination weigher according to claim 1, wherein
the predetermined recycle condition is such that the weighing hopper is not selected for the discharge combination during a predetermined time period or longer.

* * * * *